(12) United States Patent
Kajita et al.

(10) Patent No.: US 8,169,482 B2
(45) Date of Patent: May 1, 2012

(54) MONITOR VIDEO ACCUMULATION SYSTEM

(75) Inventors: Satoshi Kajita, Fukuoka (JP); Ikuo Fuchigami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 534 days.

(21) Appl. No.: 12/439,873

(22) PCT Filed: Sep. 18, 2007

(86) PCT No.: PCT/JP2007/068047
§ 371 (c)(1),
(2), (4) Date: Mar. 12, 2009

(87) PCT Pub. No.: WO2008/036657
PCT Pub. Date: Mar. 27, 2008

(65) Prior Publication Data
US 2010/0026810 A1    Feb. 4, 2010

(30) Foreign Application Priority Data

Sep. 20, 2006    (JP) .................................. 2006-254315

(51) Int. Cl.
  H04N 7/18    (2006.01)
  H04N 7/12    (2006.01)
(52) U.S. Cl. .................................. 348/159; 375/240.12
(58) Field of Classification Search .................. 348/153, 348/159; 375/240.12
See application file for complete search history.

(56) References Cited

U.S. PATENT DOCUMENTS

2002/0196330 A1*   12/2002   Park et al. ........................ 348/49
2003/0048356 A1*   3/2003    Kohno et al. ................... 348/143
2003/0158899 A1    8/2003    Hughes
2004/0218672 A1    11/2004   Bourne et al.
2005/0036036 A1    2/2005    Stevenson et al.
2006/0159172 A1*   7/2006    Mori ........................ 375/240.13

FOREIGN PATENT DOCUMENTS

| GB | 2 359 209 | 8/2001 |
| GB | 2 377 573 | 1/2003 |
| JP | 7-327228 | 12/1995 |
| JP | 2000-32435 | 1/2000 |
| JP | 2003-111025 | 4/2003 |

(Continued)

OTHER PUBLICATIONS

Mantiuk et al., "Perception-motivated high dynamic range video encoding", Aug. 2004, ACM Publication, SIGGRAPH 2004—ACM Transactions on Graphics, vol. 23, No. 3, New York, NY, p. 733-738.*

(Continued)

*Primary Examiner* — Jeffrey R Swearingen
*Assistant Examiner* — Taylor Elfervig
(74) *Attorney, Agent, or Firm* — Wenderoth, Lind & Ponack, L.L.P.

(57) ABSTRACT

A surveillance video accumulation system pertaining to the present invention includes a plurality of surveillance camera units and a video accumulation unit that are connected with each other via a network. Among pieces of video data that have been encoded according to a prediction encoding method and transmitted from all the surveillance camera units, the video accumulation unit accumulates video data transmitted from a selected one of the surveillance camera units. Before the selection, if specified as a surveillance camera unit that is expected to shoot a subject, each of the surveillance camera units encodes video data of the subject based only on intra frame prediction and transmits the encoded video data to the accumulation unit.

5 Claims, 8 Drawing Sheets

FOREIGN PATENT DOCUMENTS

JP            2003-189301        7/2003

OTHER PUBLICATIONS

Ouaret et al., "Fusion-based multiview distributed video coding", Oct. 2006, ACM Publication, Proc. ACM Int. Workshop Video Surveillance Sensor Networks, Santa Barbara, CA, p. 139-144.*

He et al., "Transmission Distortion Analysis for Real-Time Video Encoding and Streaming Over Wireless Networks", Sep. 2006, IEEE Publication, IEEE Transactions on Circuits and Systems for Video Technology, vol. 16, No. 9, p. 1051-1062.*

International Search Report issued Dec. 25, 2007 in the International (PCT) Application of which the present application is the U.S. National Stage.

European Search Report issued Jan. 28, 2011 in corresponding European Application No. 07 807 448.1.

* cited by examiner

MONITOR VIDEO ACCUMULATION SYSTEM

TECHNICAL FIELD

The present invention relates to a surveillance video accumulation system that accumulates surveillance videos, which are pieces of encoded moving picture data. In particular, the present invention relates to a video accumulation technique for recording video data of a moving subject while switching among a plurality of camera units.

BACKGROUND ART

Conventionally, surveillance has been conducted with use of surveillance cameras installed in buildings. For example, a warden monitors monitor windows which display videos sent from the surveillance cameras, and records video images of a suspicious individual or the like, if any.

In such surveillance, when the suspicious individual goes out of a monitor window, i.e. goes out of a shooting zone of a single surveillance camera, the warden manually designates the monitor windows one by one to record the video images of the suspicious individual. With such operations, only video images displayed in the designated monitor window can be recorded, and it is possible to track the suspicious individual when playing back the recording.

Meanwhile, encoding techniques that use the inter frame prediction based on correlation among pictures have been developed to reduce the data amount of the videos. In recent years, the videos sent from the surveillance cameras are encoded with use of such techniques.

Encoding techniques that use the prediction include, for example, the MPEG (Moving Picture Experts Group)-2 standard, and the H.264/MPEG-4 AVC (Advanced Video Codec) which aims to realize a higher compression rate. Since these techniques are based on correlation among pictures, they basically require another picture to refer to (hereinafter called "reference picture") in order to decode a certain picture.

Therefore, if it is when the warden designates a monitor window that the recording of the video data sent from the surveillance cameras starts, the pictures immediately after the designation can not be played back in some cases. In other words, the reference pictures of the video data might not be recorded in some cases, and the pictures immediately after the designation can not be decoded due to the lack of the reference pictures.

Figure 3:
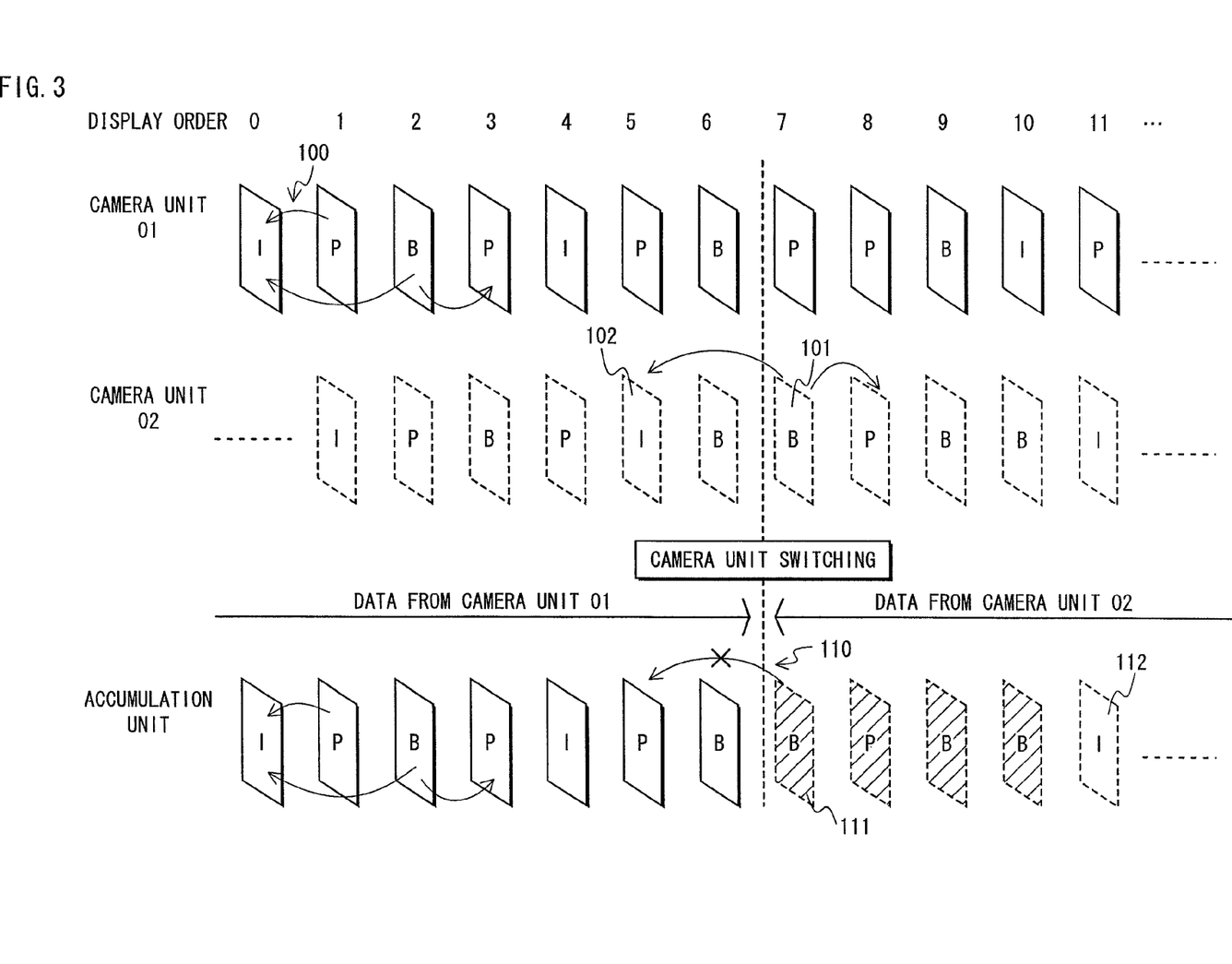
FIG. 3 shows a case of accumulating moving picture data encoded with use of a prediction encoding method while switching between camera units.

The following explains the reason why some pictures can not be decoded immediately after the designation, with reference to FIG. 3.

In this explanation, it is assumed that the user switches from a camera unit 01 to a camera unit 02, and compressed data is accumulated in an accumulation unit.

The rectangles represent the pictures, and the characters "I", "P" and "B" in the rectangles represent the picture types "I picture", "P picture" and "B picture" respectively. In this example, the I pictures have been encoded with use of the intra frame prediction, and the P pictures and the B pictures have been encoded with use of the inter frame prediction.

The rectangles illustrated in full line represent pictures sent by the camera unit 01, and the rectangles illustrated in dotted line represent pictures sent by the camera unit 02. The shaded rectangles (e.g. picture 111) represent pictures that can not be properly decoded.

The arrows represent the reference relationships between the pictures. For example, the P picture assigned with the display order "1" of the camera unit 01 refers to the I picture assigned with the display order "0" (See the arrow 100). The B picture 101 assigned with the display order "7" of the camera unit 02 refers to the I picture 102 assigned with the display order "5" and the P picture assigned with the display order "8".

Here, assume the switching to the camera unit 02, which takes place when the picture assigned with the display order "6" of the camera unit 01 has been accumulated.

The accumulation unit at the bottom of the drawing stores the pictures from the camera unit 01 until the display order "6". From the display order "7", the accumulation unit stores the pictures from the camera unit 02. When playing back the pictures accumulated in the accumulation unit, it is impossible to properly decode the picture 111, because the reference picture 102 is not accumulated in the accumulation unit (See the arrow 110). The playback can not be performed properly until the next I picture 112 comes.

There have been suggestions of a technique to avoid the interruptions in the video of the suspicious individual.

One of such suggestions is a technique to reduce the delay time in switching among TV cameras (Patent Document 1). In brief, a TV camera, which has detected the switching, firstly generates encoded picture data using the intra prediction which does not require any reference pictures, and starts the transmission with the generated picture.

If applying this technique to the surveillance cameras, the picture encoded with use of the intra prediction will be transmitted immediately after notification of the switching. Therefore, it is possible to receive and record the picture which does not require any reference pictures immediately after the switching. As a result, it is possible to start the playback of the subsequent pictures. Note that it is assumed here that the pictures after the switching do not refer to the pictures before the switching.

Another one of the suggestions mentioned above is a technique to predict the motion of the subject based on the motion vectors generated in the case the video data is encoded (Patent Document 2). If applying this technique to the surveillance cameras, it is possible to avoid partially missing the pictures of the moving subject, by recording both the video data from the surveillance camera that is currently shooting the subject and the video data from the surveillance camera that is expected to shoot the subject next.

Patent Document 1: Japanese Laid-open Patent Application Publication No. 7-327228
Patent Document 2: Japanese Laid-open Patent Application Publication No. 2000-32435

SUMMARY OF THE INVENTION

Problems to be Solved by the Present Invention

However, even if the transmission of the pictures, beginning with the picture encoded with use of the intra frame prediction, is started immediately after the detection of the designation of (i.e. the switching to) one of the surveillance cameras, it is impossible to completely avoid the decoding failure of some of the pictures of the video data that is being recorded.

Figure 4:
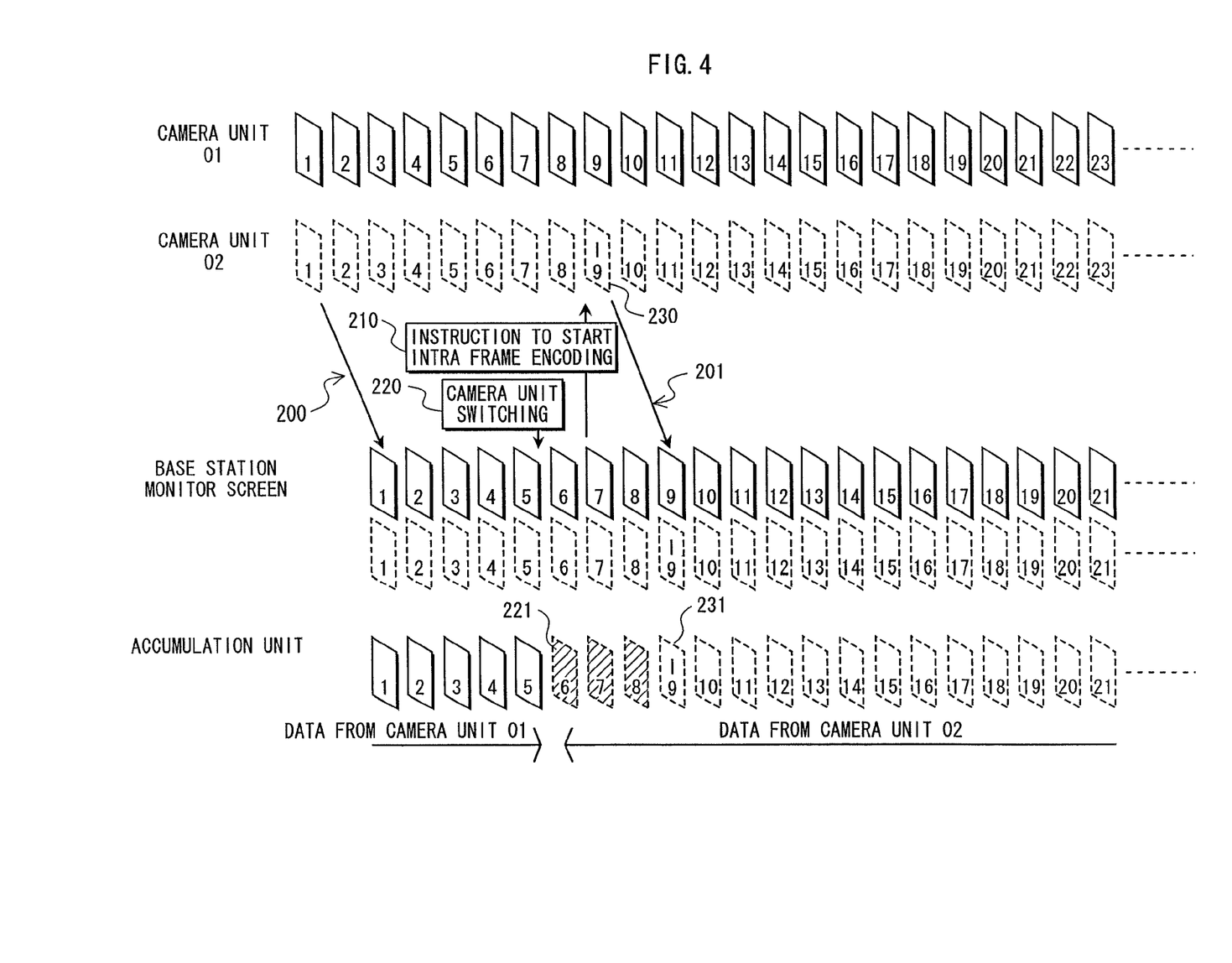
FIG. 4 shows a case of switching between camera units from a monitor screen.

The following explains the reason why it is impossible to completely avoid the decoding failure, with reference to FIG. 4.

FIG. 4 shows the case of switching the camera units, via the monitor screen. This drawing shows that a decoding failure is caused even though the camera unit has immediately generated an I picture after the switching. In this drawing, the numbers shown in the rectangles represent the display order, and the character "I" represents that it is an I picture.

Assume that the monitor screen at the base station is displaying videos that the camera unit 01 and the camera unit 02 are shooting. The monitor screen displays the videos from the camera units with a delay for a few pictures. In this drawing, the delay is for two pictures (See the arrow 200). This delay is caused because the encoding processing, the communication processing, and the decoding processing require a certain amount of time.

Also assume that the video from the camera unit 01 is being accumulated first. The warden switches the camera units upon viewing on the monitor screen the picture assigned with the display order "5" of the camera unit 01 (See the operation 220). After that, a picture assigned with the display order "6" of the camera unit 02, namely, a picture 221 will be accumulated.

At the switching, the base station transmits an instruction to start the encoding with use of the intra frame prediction to the camera unit 02 (See the operation 210). The camera unit 02 generates, as an I picture, a picture 230 assigned with the display order "9", and transmits it to the base station (See the arrow 201).

When playing back the accumulated data, regarding the accumulated pictures from the camera unit 02, it is not until the picture 231 assigned with the display order "9" that the decoding can be properly performed. The pictures assigned with the display orders "6", "7" and "8" can not be properly decoded.

This is because, even if the camera unit 02 generates the I picture immediately after the switching, the monitor screen which the warden is watching is displaying pictures from the camera units with the delay. Accordingly, it is impossible to completely avoid the occurrence of pictures that can not be decoded even if the instruction is transmitted as quickly as possible.

In view of this problem, the present invention aims to provide a surveillance video accumulation system in which even in the case of recording video data of a moving subject while switching among a plurality of surveillance cameras, it is possible to play back the data without missing any pictures of the data after the switching of the cameras.

Means for Solving the Problem

To solve the problem explained above, the surveillance video accumulation system pertaining to the present invention is a surveillance video accumulation system that includes a plurality of surveillance camera units and a video accumulation unit that are capable of exchanging data with each other, the video accumulation unit comprising: a selector operable to select one of the surveillance camera units; and an accumulator operable to start receiving and accumulating video data from the one of the surveillance camera units when the selector selects the one, the video data having been encoded according to a prediction encoding method, and each of the surveillance camera units comprising: an encoder operable to encode video data of a subject of shooting, according to a prediction encoding method;

a video data transmitter operable to transmit the encoded video data to the video accumulation unit; and a specifier operable to specify one or more of the surveillance camera units that are expected to shoot the subject next, based on the video data encoded by the encoder, and transmit, to the one or more of the surveillance camera units, specification information showing that the one or more of the surveillance camera units have been specified by the specifier, wherein on receipt of the specification information, the encoder starts encoding the video data, according to a prediction encoding method that uses only intra frame prediction.

Advantageous Effects of the Present Invention

In the surveillance video accumulation system having the stated structure, the surveillance camera unit that has a shooting zone that the subject is expected to enter next starts the encoding that uses only the intra frame prediction. Accordingly, even if the accumulation of the video data is started immediately after the surveillance camera unit is selected, it is possible to accumulate the data encoded by the intra frame prediction.

Therefore, all the accumulated video data can be played back as long as the predicted surveillance camera unit has been selected.

The selector of the video accumulation unit may further transmit, to the one of the surveillance camera units, selection information showing that the one of the surveillance camera units has been selected by the selector, and on receipt of the selection information, the encoder of the one of the surveillance camera units may start encoding the video data of the subject of shooting, according to a prediction encoding method that selectively uses either intra frame prediction or inter frame prediction.

With the stated structure, the normal prediction encoding method is set again when the accumulation of the video data is started according to the selection of the surveillance camera unit that has a shooting zone that the subject is expected to enter next. As a result, it is possible to reduce the total amount of the data to be accumulated.

This is because the data mount in the case of the encoding with use of only the intra frame prediction is much greater than the data amount in the case of the encoding with use of the inter frame prediction in addition.

The structure also reduces the bandwidth usage required for the data transmission.

The specifier may specify the one or more of the surveillance camera units by using a moving direction of the subject based on a motion vector included in the encoded video data.

With the stated structure, the motion vector detected in the encoding of the video data is used for specifying the surveillance camera unit that has a shooting zone that the subject is expected to enter next. Therefore, the surveillance camera unit can be specified based on the currently existing information. In other words, it is unnecessary to provide any unit for detecting the movement of the subject.

Also, a surveillance camera unit pertaining to the present invention may be a surveillance camera unit comprising: an encoder operable to encode video data of a subject of shooting, according to a prediction encoding method; and a video data transmitter operable to transmit the encoded video data outward, wherein the encoder encodes the video data, according to a prediction encoding method that uses only intra frame prediction, or a prediction encoding method that selectively uses either intra frame prediction or inter frame prediction.

With the stated structure, it becomes easy to establish the surveillance video accumulation system of the present invention.

DESCRIPTION OF NUMBERING

10 base station
20 network
30 monitor screen
1000, 2000, 3000, 4000 camera unit
1100, 2100 imaging part
1200, 2200 encoding part
1300, 2300 video transmission part
1400, 2400 prediction camera determination part
1500, 2500 prediction camera transmission/reception part
1600, 2600 switching instruction receiving part
5000 accumulation unit
5100 video receiving part
5200 switching instruction transmission part
5300 camera switching part
5400 accumulation part
5500 decoding part
5600 display part

DETAILED DESCRIPTION OF THE INVENTION

Embodiment

Outline

A surveillance video accumulation system pertaining to the present invention predicts the direction in which the subject moves, and instructs a surveillance camera that is shooting toward the direction (hereinafter called the "prediction camera") to start encoding with use of only the intra frame prediction before the beginning of the accumulation of video data from the prediction camera.

The monitor screen that the warden is watching is displaying the videos from the camera units with a little delay. Therefore, the prediction camera prepares an encoded video by using only the intra frame prediction, in order to make up the gap caused by the delay, so that the accumulation can be started at any time.

Accordingly, if the video from the prediction camera is designated on the monitor, only pictures that have been encoded by the intra frame prediction will be recorded, and pictures that can not be decoded will not be recorded. This means that the playback of the recorded pictures will be performed without interruption.

In the following explanation, the surveillance camera that has been designated and whose video is being accumulated is called "the accumulation camera", and the encoded video data is called "the compressed data".

Figure 5:
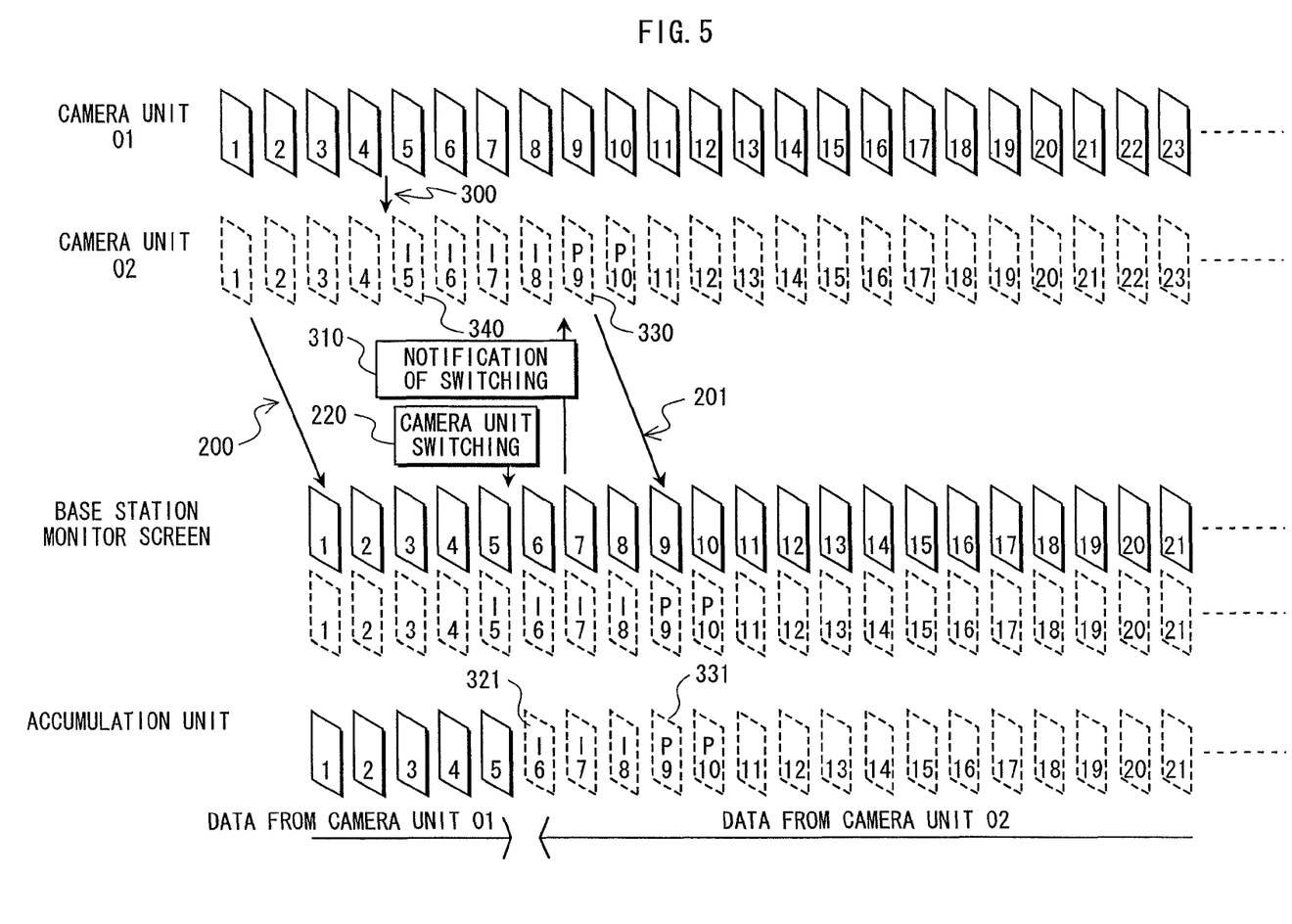
FIG. 5 shows a case, pertaining to the present invention, of switching between camera units from a monitor screen.

Before the explanation of the surveillance video accumulation system pertaining to the present invention, the following explains the essential features of the present invention, with reference to FIG. 5.

Essential Features of the Present Invention

FIG. 5 shows the case, pertaining to the present invention, of switching between the camera units according to the designation via the monitor screen. In the same manner as FIG. 3 and so on, the rectangles represent the pictures, and the characters "I" in the rectangles represent the picture type "I picture". The rectangle without picture type is either one of the "P picture" and the "B picture". The rectangles illustrated in full line represent pictures sent by the camera unit 01, and the rectangles illustrated in dotted line represent pictures sent by the camera unit 02.

The following explanation is based on the same assumption as FIG. 4. The surveillance video accumulation system pertaining to the present invention predicts that the subject will move toward the camera unit 02 during the accumulation of the data from the camera unit 01, and instructs the camera unit 02 to perform the encoding using only the intra frame prediction (See the arrow 300).

How to specify the prediction camera is explained in the later section, with reference to FIG. 6. Here, note that the I pictures in this example do not refer to the preceding pictures.

In this drawing, the picture assigned with the display order "5" of the camera unit 02 is firstly generated as an I picture. Therefore, even if the switching between the camera units takes place (See the operation 220) and the picture assigned with the display order "6" is firstly accumulated, the decoding can be performed.

After that, the camera unit 02 receives a notification showing that the switching has taken place (See the operation 310), and performs the normal decoding from the picture assigned with the display order "9". Here, the picture assigned with the display order "9" is, for example, generated and transmitted as a P picture 330 which refers to the I picture assigned with the display order "8", and accumulated as a P picture 331 assigned with the display order "9".

Therefore, in the playback of the data accumulated in the accumulation unit, the pictures from the camera unit 01 is played back until the display order "5", and without interruption, the pictures from the camera unit 02 is played back from the I picture 321 assigned with the display order "6".

Also, when the prediction camera becomes the accumulation camera, the encoding by this camera shifts from the encoding with use of only the intra frame prediction to the normal encoding with use of both the intra frame prediction and the inter frame prediction. As a result, it is possible to suppress the increase of the load of the encoding and the communications.

The timing of the shifting to the normal encoding can be variously changed. In this embodiment, it is assumed that the encoding shifts from the encoding with use of only the intra frame prediction to the normal encoding when designation of any of the surveillance camera units, including the prediction camera, is detected.

How to Specify the Prediction Camera

FIG. 6 shows how to specify the prediction camera.

There are various ways to specify the prediction camera. For example, if the cameras are capable of changing the angle by tracking the moving subject, the next camera can be predicted based on the movement of the camera that tracks the subject.

The following explains an example case where the prediction is performed based on the motion vectors detected in the encoding with use of the inter frame prediction.

In this example, the prediction camera is specified by any of the camera units, because the encoding is performed by each of the camera units.

Figure 6A:
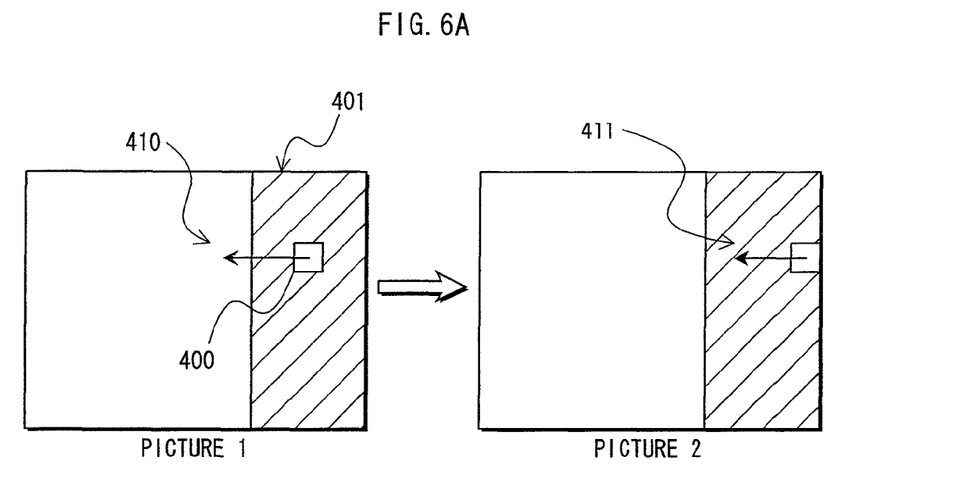
FIG. 6A and FIG. 6B show how to specify a prediction camera.
Figure 6B:
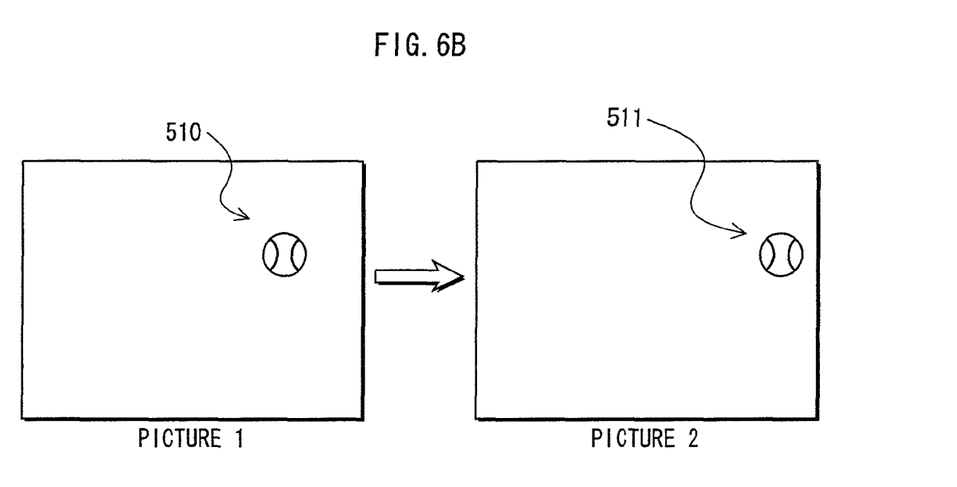

FIG. 6A is a conceptual diagram showing the way of the prediction, and FIG. 6B is a specific example. The time flows from the picture 1 to the picture 2. The screen is consisted of a plurality of macro blocks as units of the encoding, and its size is 16 pixels by 16 pixels.

First, in FIG. 6A, if the motion vector of the macro block 400 included in the shaded area 401 in the picture 1 is the motion vector 410 that moves to the left, and the motion vector in the picture 2 is the motion vector 411 that also moves to the left, it can be predicted that the subject is moving to the right. Therefore, it is possible to determine that the camera unit that is shooting the zone on the immediate right to the zone of these pictures is the prediction camera.

The area 401 is used for conjecturing that the subject is moving through the picture toward the right. Such an area is provided on the left, right, top and bottom of the picture. For example, an area on the top of the picture is used for conjecturing that the subject is moving to the top.

Specifically, as the pictures 1 and 2 in FIG. 6B show, it can be predicted that the ball 510 moves from the left to the right and becomes the ball 511, and goes through the picture toward the right.

The total of motion vectors may be used instead of the motion vector mentioned above, for example. The timing of sending an instruction to the prediction camera may be determined by calculating the moving direction and the moving speed of the subject based on the direction of the total of the motion vectors.

Also, it is not necessary that there is only a single prediction camera, and there may be a plurality of prediction cameras. For example, in the case where the subject does not move in a straight line and the case where the subject moves diagonally, it is necessary to track the subject by a plurality of prediction cameras.

The following explains the surveillance video accumulation system of the embodiment of the present invention, with reference to the drawings. Note that this embodiment explains the case of storing moving picture data generated in conformity with the H.264/MPEG-4AVC standard.

Functions

Figure 1:
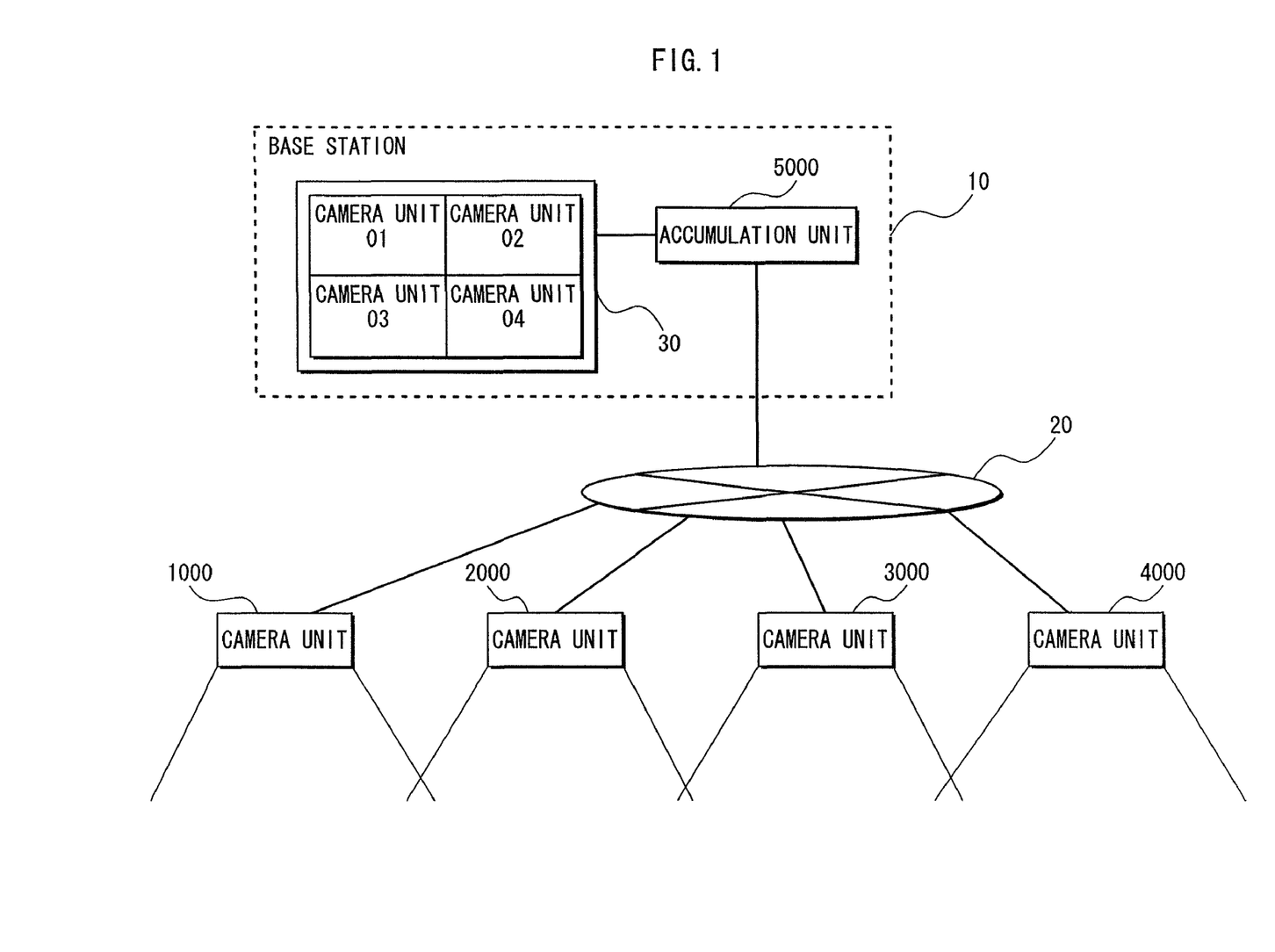
FIG. 1 is a diagram showing the overall structure of a surveillance video accumulation system.

FIG. 1 is a diagram showing the overall structure of the surveillance video accumulation system.

The surveillance video accumulation system includes a base station 10 and four camera units (1000, 2000, 3000 and 4000), which are connected together via the network 20.

The base station 10 includes a monitor 30 and an accumulation unit 5000. The monitor 30 displays videos, which have been shot and transmitted from the camera units (1000-4000), in monitor windows thereof. The accumulation unit 5000 stores moving picture data from one of the camera units (1000-4000).

Among the videos transmitted from the camera units (1000-4000), the video to be stored by the accumulation unit 5000 is designated by the operator (not illustrated) who monitors the monitor 30.

Figure 2:
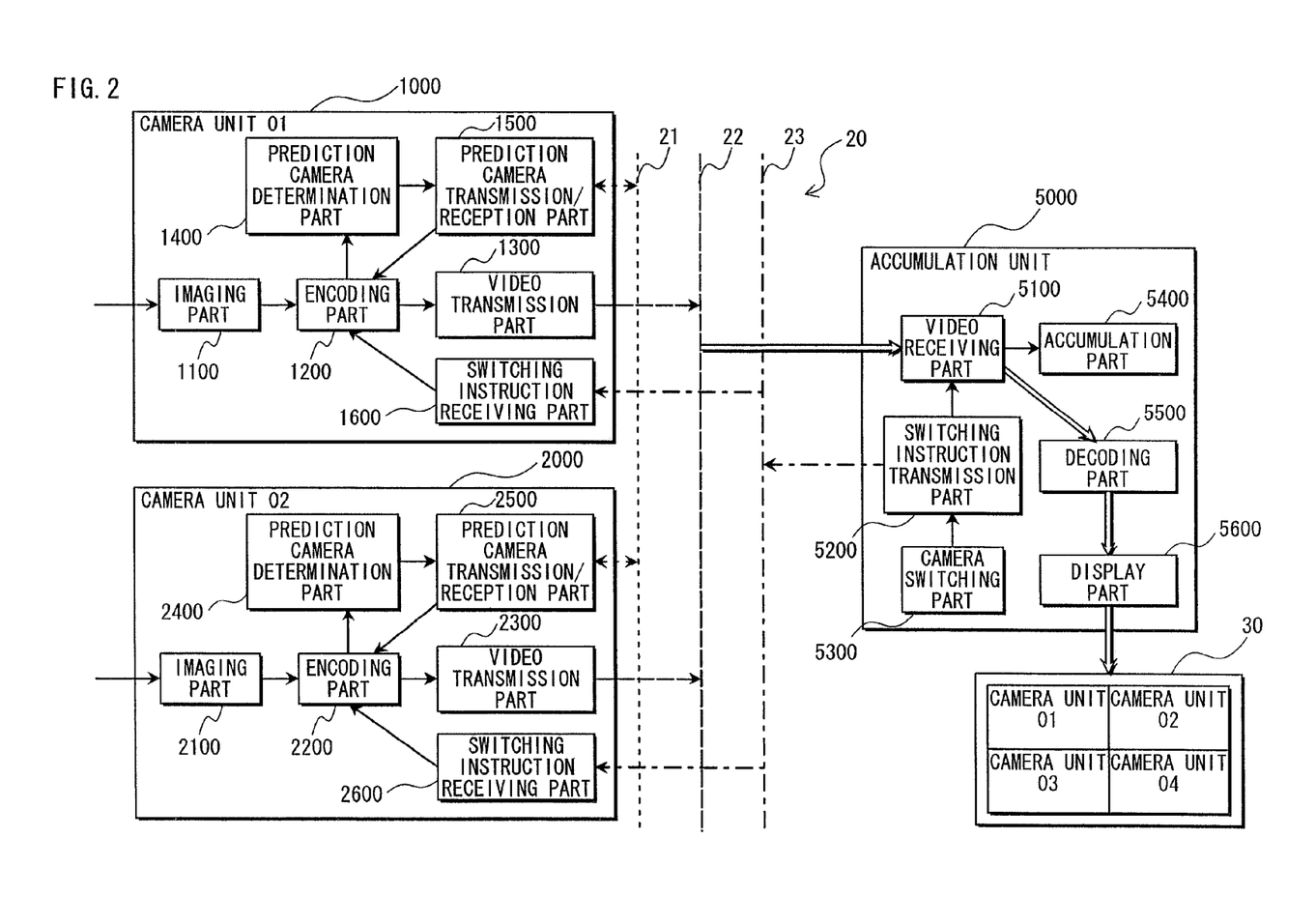
FIG. 2 is a functional block diagram showing the structures of camera units (1000 and 2000) and an accumulation unit 5000.

FIG. 2 is a functional block diagram showing the structures of the camera units (1000 and 2000) and the accumulation unit 5000.

Among the four camera units (1000-4000), only two camera units, namely the camera unit 1000 and the camera unit 2000, are illustrated in this drawing, for simplification. Note that the camera unit 1000, the camera unit 2000, the camera unit 3000 and the camera unit 4000 are hereinafter called the camera unit 01, the camera unit 02, the camera unit 03 and the camera unit 04 respectively. Also, note that the network 20 is represented by three dotted lines (21, 22 and 23) for simplification, according to the type of data that is transmitted or received.

Firstly, the structures of the camera units (1000-4000) are described.

The camera units (1000-4000) have the same structure. For example, an imaging part 1100 of the camera unit 01 and an imaging part 2100 of the camera unit 02 have the same functions.

Therefore, only the camera unit 1000, that is, the camera unit 01 is explained here.

The camera unit 01 includes an imaging part 1100, an encoding part 1200, a video transmission part 1300, a prediction camera determination part 1400, a prediction camera transmission/reception part 1500, and a switching instruction receiving part 1600.

The imaging part 1100 includes a lens, a CCD (Charge Coupled Device) and so on. The imaging part 1100 has a function to convert the reflection light from the subject, collected by the lens, into electrical signals with use of the CCD, and further convert the electrical signals into digital signals, and generate moving picture data by performing various types of signal processing on the digital signals. The imaging part 1100 outputs the generated moving picture data to the encoding part 1200.

The encoding part 1200 has a function to encode the moving picture data generated by the imaging part 1100. In other words, the encoding part 1200 generates compressed data.

The encoding part 1200 generates two types of compressed data. One is that consisted of only pictures encoded with the intra frame prediction, and the other is that consisted of pictures encoded with the intra frame prediction and pictures encoded with the inter frame prediction.

The former type is generated in the case the camera unit 01 (i.e. the camera that performs this encoding) is the prediction camera. The latter is generated in the other cases. In other words, the latter is generated in the case where the camera unit that performs the encoding is the accumulation camera and the case where it is neither the predication camera nor the accumulation camera.

Which type of compressed data should be generated, that is, whether the camera is the prediction camera or not, is judged according to notification from the prediction camera transmission/reception part 1500 or the switching instruction receiving part 1600, which are explained later.

The encoding part 1200 outputs the generated compressed data to the video transmission part 1300 and the prediction camera determination part 1400. However, note that the encoding part 1200 outputs it to the prediction camera determination part 1400 only when the video that the camera unit 01 is shooting is being accumulated, that is, when the camera unit 01 is the accumulation camera.

The frame memory and so on required for the encoding are included in the encoding part 1200, and the camera unit number of the current accumulation camera is memorized in the work memory inside.

The video transmission part 1300 has a function to transmit the compressed data to the accumulation unit 5000 of the base station 10 (See the network 22).

The prediction camera determination part 1400 has a function to predict the camera unit to be used after the switching, based on the compressed data input from the encoding part 1200. In other words, the prediction camera determination part 1400 predicts the direction in which the subject moves next, and predicts the camera unit (i.e. the prediction camera)

that has a shooting zone which the subject comes into. The details of the specification are described later, with reference to FIG. 6.

The prediction camera transmission/reception part 1500 has a function to notify the camera unit, which has been specified by the prediction camera determination part 1400, about the specification (See the network 21).

The prediction camera transmission/reception part 1500 also has a function to receive the notification about the specification from the other camera units. On reception of the notification of the specification, the prediction camera transmission/reception part 1500 sends the notification to the encoding part 1200.

The switching instruction receiving part 1600 has a function to receive designation of the camera unit that is to be the next accumulation camera (See the network 23), and notify the encoding part 1200 about the designation. If the designated camera unit is the camera unit that has received the designation and it becomes the accumulation camera, the switching instruction receiving part 1600 notifies the encoding part 1200 about it.

Next, the structure of the accumulation unit 5000 is explained.

The accumulation unit 5000 includes a video receiving part 5100, a switching instruction transmission part 5200, a camera switching part 5300, an accumulation part 5400, a decoding part 5500 and a display part 5600.

The video receiving part 5100 has a function to receive compressed data transmitted from the camera units (1000-4000). The hollow arrow shows the data from the camera units. The video receiving part 5100 outputs the received compressed data to the decoding part 5500.

The video receiving part 5100 also has a function to output compressed data received from the accumulation camera to the accumulation part 5400. The video receiving part 5100 is notified of the accumulation camera by the switching instruction transmission part 5200 which is explained later, and the information that identifies the accumulation camera will be stored in the internal memory.

The switching instruction transmission part 5200 has a function of notifying all the camera units, of the camera unit (i.e. the accumulation camera) that is shooting the video that is being displayed on the monitor window designated by the operator (See the network 23). The switching instruction transmission part 5200 also notifies the video receiving part 5100, of compressed data of which camera unit should be accumulated by the accumulation part 5400.

The camera switching part 5300 receives an instruction from the operator, and notifies the switching instruction transmission part 5200, the video displayed in which display window should be accumulated.

The accumulation part 5400 has a function to accumulate pieces of compressed data that has been output by the video receiving part 5100.

The decoding part 5500 has a function to decode the pieces of compressed data received from the video receiving part 5100, and transmit them to the display part 5600.

The display part 5600 has a function to display the moving picture data that has been received from the decoding part 5600 and decoded, on the screen windows of the monitor 30.

Operations

Figure 7:
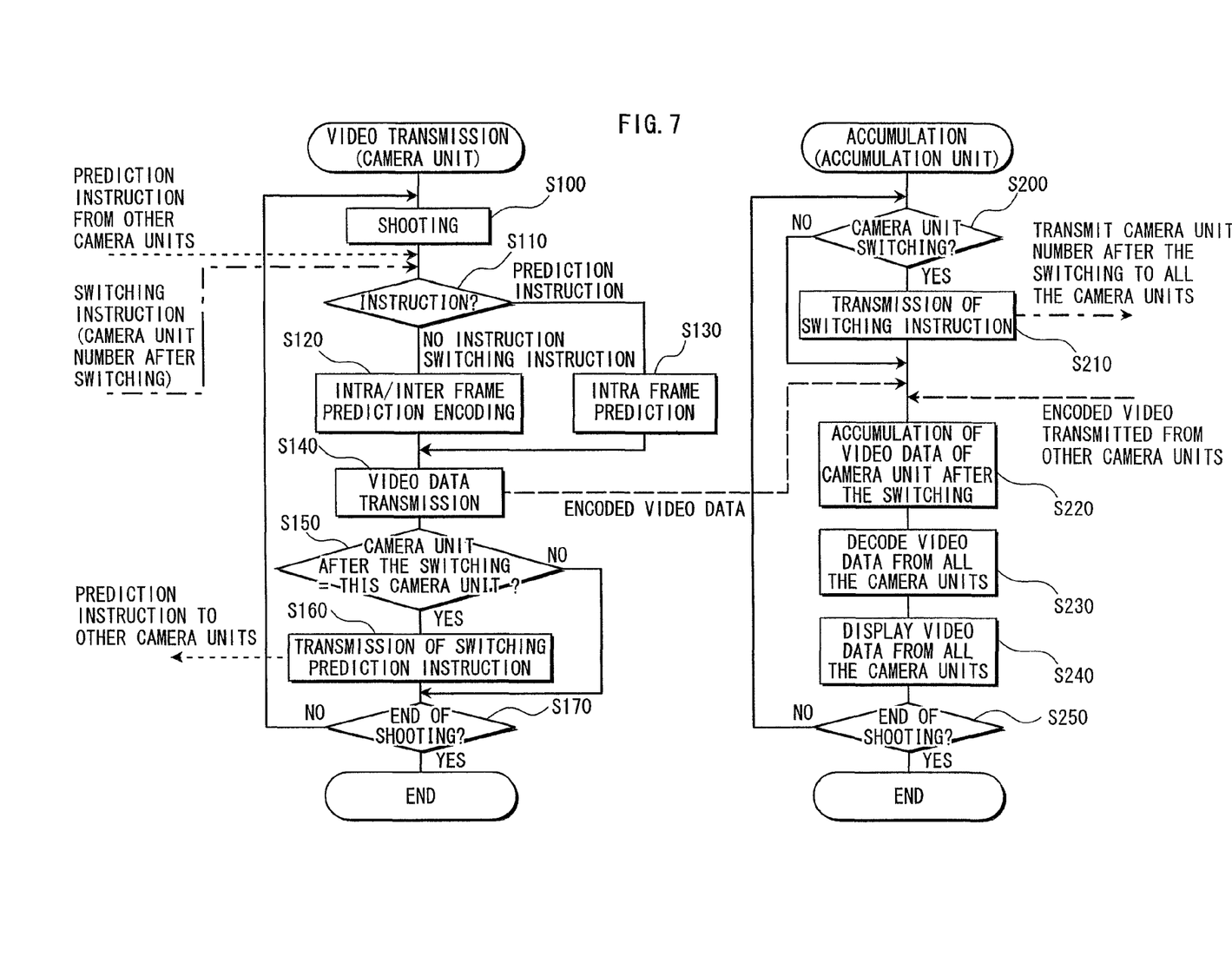
FIG. 7 is a flowchart showing video transmission by camera units and accumulation of surveillance videos by an accumulation unit.

The following explains the operations performed by the surveillance video accumulation system pertaining to the present invention, with reference to FIG. 7.

FIG. 7 is a flowchart showing the video transmission by the camera units and the accumulation of the surveillance videos by the accumulation unit 5000. Since all the camera units have the same function and perform the same operations, the same flowchart is used for the explanation even when the operation is performed by a different one of the camera units.

The following explanation is based on the assumption that the switching from the camera unit 01 to the camera unit 02 takes place. At first, the camera unit 01 is the accumulation camera.

First, the accumulation operation performed by the accumulation unit 5000 is explained.

The operator is monitoring the monitor 30. The monitor 30 is displaying all the videos that are being shot by the camera units. The camera unit 01 has been designated as the accumulation camera.

Specifically, the video receiving part 5100 receives compressed data transmitted from the camera units, and outputs compressed data from the accumulation camera, namely the camera unit 01, to the accumulation part 5400 which accumulates the received data (Step S200: NO, Step S220).

The video receiving part 5100 outputs the compressed data from the camera units to the decoding part 5500, and the decoding part 5500 decodes the received data (Step S230) and display the decoded data on the monitor 30 via the display part 5600 (Step S240).

The accumulation unit 5000 continues the accumulation operation until receiving an operator's instruction to stop shooting the subject (Step S250).

The operator finds a suspicious individual in the monitor window for the camera unit 01. As the suspicious individual moves and enters into the shooting zone of the camera unit 02, the operator performs the switching from the camera unit 01 to the camera unit 02 so that the video from the camera unit 02 will be accumulated.

The camera switching part 5300 that has detected the operator's instruction notifies the switching instruction transmission part 5200, of that the accumulation camera has been designated (Step S200: YES). For this purpose, the camera switching part 5300 notifies the camera unit number of the accumulation camera. In this example, the camera switching part 5300 notifies the camera unit number "02" of the camera unit 02.

The switching instruction transmission part 5200, which has received the camera unit number of the accumulation camera, transmits the camera unit number of the accumulation camera, as a switching instruction, to all the camera units (Step S210). This is performed, in the case where there are a plurality of prediction cameras, to change the type of the encoding performed by the camera unit that has not become the accumulation camera from the intra frame encoding back to the normal encoding.

After that, the switching instruction transmission part 5200 notifies the video receiving part 5100, of the camera unit number "02" of the accumulation camera.

The video receiving part 5100, which has been notified, stores the received camera unit number "02" of the accumulation camera into the work memory, and outputs, to the accumulation part 5400, only the compressed data from the accumulation camera, namely the camera unit 02, among the pieces of compressed data being transmitted from the camera units respectively. The accumulation part 5400 accumulates the received compressed data from the camera unit 02 (Step S220).

Also, the video receiving part 5100 outputs, to the decoding part 5500, the pieces of compressed data received from all the camera units respectively, and the decoding part 5500 decodes the compressed data (Step S230). The pieces of decoded data of the camera units are respectively displayed on the monitor 30, via the display part 5600 (Step S240).

The Steps S220 to S240 are repeated until the operator switches the camera units, and the monitor 30 continues displaying the videos from the camera units.

Next, the video transmission operation performed by the camera unit 01 and so on is described.

The camera unit 01 as the accumulation camera is described first.

The imaging part 1100 of the camera unit 01 outputs the moving picture data, shot by the imaging part 1100, to the encoding part 1200 (Step S100).

The encoding part 1200, which has received the moving picture data, encodes the moving picture data to generate compressed data (Step S110: NO INSTRUCTION, Step S120), and transmits the compressed data to the accumulation unit 5000 via the video transmission part 1300 (S140).

Since the camera unit 01 is the accumulation camera (Step S150: YES), the encoding part 1200 of the camera unit 01 outputs the compressed data to the prediction camera determination part 1400 as well.

The encoding part 1200 has stored the camera unit number of the current accumulation camera in the work memory. If the stored number is the same as the camera unit number of the camera 01, the encoding part 1200 judges that the camera unit 01 is the accumulation camera.

The prediction camera determination part 1400, which has received the compressed data, specifies the prediction camera based on the motion vector within the compressed data (See FIG. 6).

After that, the prediction camera determination part 1400 transmits, via the prediction camera transmission/reception part 1500, a prediction instruction that represents the specification of the prediction camera, to the camera unit that has been specified as the prediction camera (Step S160). In this example, the prediction camera determination part 1400 transmits the prediction instruction to the camera unit 02.

The camera unit 01 continues the video transmission operation until receiving an operator's instruction to stop shooting the subject (Step S170).

Next, operations performed by the camera unit 02 which has received the prediction instruction are explained.

In the same manner as the camera unit 01, the camera unit 02 is transmitting the compressed data to the accumulation unit 5000 (Step S100, Step S110: NO INSTRUCTION, Step S120, Step S140).

Here, upon receipt of the prediction instruction from the camera unit 01 (Step S110: PREDICTION INSTRUCTION), the prediction camera transmission/reception part 2500 of the camera unit 02 notifies the encoding part 2200, of the receipt of the instruction.

The encoding part 2200, which has been notified, starts the encoding with use of only the intra frame prediction (Step S130). Further, the encoding part 2200 transmits the compressed data, generated by the encoding, to the accumulation unit 5000 via the video transmission part 2300. The encoding part 2200 continues the encoding with use of only the intra frame prediction, until receiving the next switching instruction.

Since the camera unit 02 is not the accumulation camera (i.e. the current accumulation camera is the camera unit 01) (Step S150: NO), the encoding part 2200 does not transmit the compressed data, and continues the shooting (Step S100).

After that, the operator designates the camera unit 02, and the switching instruction is transmitted to all the camera units (Step S210). Upon receipt of the switching instruction by the switching instruction receiving part 2600, the encoding part 2200 is notified of the receipt and the camera unit number "02".

The encoding part 2200, which has received the notification of the receipt of the switching instruction, performs the encoding with use of the inter frame prediction and the intra frame prediction (Step S120).

Also, the encoding part 2200 stores the received camera unit number "02", as the accumulation camera number, in the work memory. Here, since the camera unit number "02" is the number of the camera unit that has received the camera unit number, the camera unit 02 recognizes that the camera unit 02 becomes the accumulation camera, and outputs the compressed data to the prediction camera determination part 2400.

After that, the camera unit 02 specifies the prediction camera, and transmits a prediction instruction (Step S160).

On the other hand, the operator designates the camera unit 02, and the switching instruction is transmitted to all the camera units (Step S210). The camera unit 03, etc. which have received the switching instruction (Step S110: SWITCHING INSTRUCTION) perform the normal encoding with use of the inter frame prediction and the intra frame prediction (Step S120).

Note that the camera unit 03 is not the accumulation camera (i.e. the current accumulation camera is the camera unit 02) (Step S150: NO), the encoding part does not transmit the compressed data to the prediction camera determination part, and continues the shooting (Step S100).

Supplementary Explanations

The embodiment of the present invention has been explained above. However, the present invention is not limited to this embodiment. The following are possible modifications.

(1) In the embodiment above, the prediction camera is specified by the accumulation camera. However, the predication camera may be specified by another device. For example, the prediction camera may be specified by the accumulation unit that receives the compressed data.

(2) In the embodiment above, the surveillance camera performs the shooting using a fixed frame rate and a fixed resolution. However, the frame rate and so on in the case where the surveillance camera is the prediction camera or the accumulation camera may be different from the frame rate and so on in the other cases. For example, the camera units may perform the shooting and the transmission with use of a higher frame rate or resolution from when the camera units are designated as the prediction camera or the accumulation camera. This modification realizes the accumulation of high quality video while reducing the communication load.

(3) In the embodiment above, the prediction camera performs the encoding with use of the intra frame prediction until the accumulation camera is designated. However, in the case where the accumulation camera is not designated, the prediction camera may returns to the normal encoding after the elapse of a predetermined time.

The case where the accumulation camera is not designated is, for example, the case where although the prediction camera has been specified and the notification has been made, the subject is still remaining in the shooting zone of the current accumulation camera. In such a case, the encoding with use of the intra frame prediction continues because the accumulation camera is not designated.

(4) Part or all of the components of the surveillance video accumulation system, shown in FIG. 2, may be realized with an integrated circuit having a single chip or a plurality of chips.

(5) Part or all of the components of the surveillance video accumulation system, shown in FIG. 2, may be realized as computer programs or in any form.

In the case of the computer programs, they may be written in a recording medium in any form, such as a memory card and a CD-ROM, and read and executed by a computer. Also, they may be downloaded via a network and executed.

The Details and Consideration of the Conventional Techniques

The following explains techniques that are applicable for preventing interruption in the recording of video that is being recorded while switching among a plurality of surveillance cameras is performed.

The first technique, which aims to reduce the delay time in switching among TV cameras, is explained with reference to FIG. 8.

Figure 8:
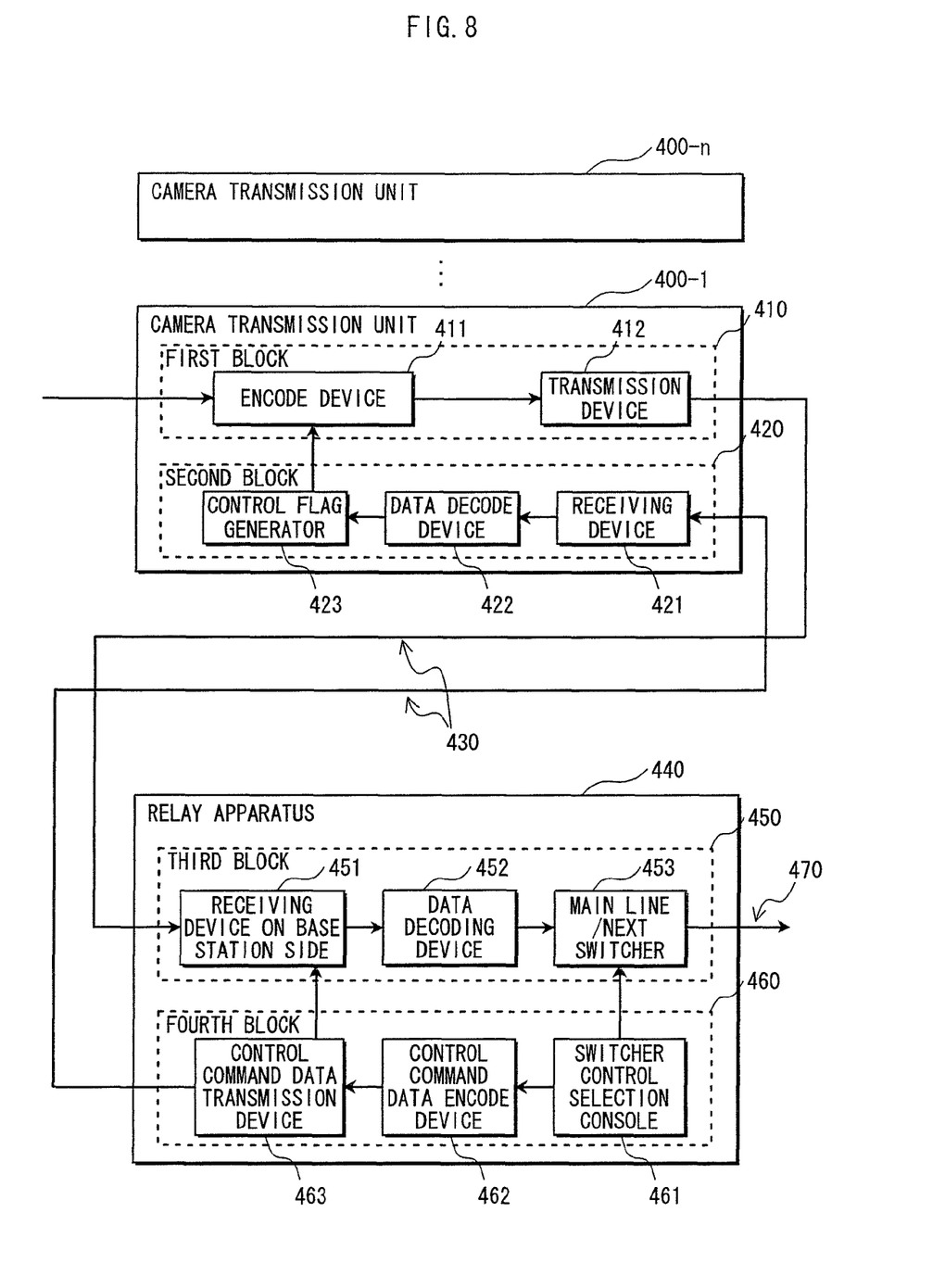
FIG. 8 is a diagram showing the structure of a conventional digital encoding/transmission system disclosed in Patent Document 1.

FIG. 8 shows the structure of a conventional digital encoding/transmission system disclosed in the Patent Document 1.

In FIG. 8, 400-1 to 400-*n* represent camera/transmission units. 400-1 is the first camera/transmission unit, and 400-*n* is the $n^{th}$ camera/transmission unit.

Each of the camera/transmission units includes a block 410 (hereinafter called "the first block") for encoding and transmitting video and audio received from the camera, and a block 420 (hereinafter called "the second block") for receiving control command signal data from the base station, decoding the received data and generating a control flag.

The first block 410 is consisted of an encode device 411 and a transmission device 412 for sending video and audio data.

The second block 420 is consisted of a receiving device 421 for receiving control command signal data used for instructing the switching among the units, a data decode device 422 for decoding the control command signal data, and a control flag generator 423 for generating a control flag (encoding indicator flag) when it is judged that the unit that includes the control flag generator 423 is selected according to the control command.

According to the control flag, the encode device 411 interrupts the encoding sequence, which has been performed for the purpose of monitoring. The encode device 411 starts encoding from an I picture (intra frame encoding picture), and transmits data to the base station.

430 indicates a wired or wireless transmission path used for data transmission between the camera transmission unit 400 and the base station.

440 is a relay apparatus of a base station (also called switching center) that is placed in a relay van or at a relay point. The relay apparatus 440 includes a block 450 (hereinafter called the third block) for receiving and decoding video and audio data from each cameras of the base station, and a block 460 (hereinafter called the fourth block) for encoding and transmitting the control command signal data to each camera.

The third block 450 is consisted of a base station side receiving device 451 for inputting video and audio data through the transmission path 430, a data decoding device 452 for decoding the video and audio data, and a main line/next switcher 453 having a plurality of monitors.

The fourth block 460 is consisted of a switcher control selection console 461 for switching and selecting a broadcast video from among a plurality of videos displayed on the monitor, a control command data encode device 462 for encoding a control command signal data used for informing the selected camera/transmission unit about the selection, and a control command signal data transmission device 463 for transmitting the encoded control command signal data through the transmission path 430.

470 is a broadcast main line (hereinafter called the main line) that is connected with the output terminal of the main-line/next switcher 453.

Firstly, the video and audio signals from a camera are digital encoded by the encode device 411. In the case where the camera is not used as the output of the main line, the encode device 411 performs encoding such that the normal encoding sequence is output for use in the monitoring. The order of the picture types is, for example, I-P-B-B-P-B-B-.

On the other hand, in the case where the control command for using the camera as the output of the main line is received by the receiving device 421 and the data decode device 422, the control flag generator 423 generates a control flag. This control flag instructs the encode device 411 to interrupt the encoding that has been performed and switch to the intra frame encoding (I picture encoding).

Subsequently, the control flag instructs the encode device 411 to change the encoding type to the I picture in order to inform the decoder of that the encoding beginning with the I picture has been started.

In this way, each camera/transmission unit transmits the I picture for the digital encoding of the video data for the broadcast every time the unit is selected by the base station. As a result of such an encoding control, the I picture can be inserted at a timing earlier than the normal timing, and the switching of the encode stream around the camera switching becomes smooth.

The following explains the second technique (the Patent Document 2) to predict the motion of the subject based on the motion vector in the case of encoding of the moving picture.

The surveillance system disclosed in the Patent Document 2 is a system in which a plurality of cameras are connected with monitors via a transmission lines. The plurality of cameras are switched by automatic tracking of the moving subject based on the motion vectors transmitted from the cameras, and any one of the monitors always displays the subject that is being tracked.

The camera to be used next is predicted according to the motion vector transmitted from the current camera. The camera angle is set according to the predicted position of the subject, and the video from the current camera and the video from the next camera are displayed on the two monitor windows at the same time. In other words, the system has a function to automatically tracking the moving subject and to sequentially switch among the plurality of cameras.

As explained above with reference to FIG. 4, even if the first technique is applied to the surveillance video accumulation system of the present invention, it is impossible to completely avoid the decoding failure of some pictures. This is because the video data, whose recording has been started according to the designation of a monitor window by the warden, is slightly delayed from the data that is currently being recorded.

Therefore, a technique to bridge the time difference between the video on the monitor and the video that is currently being recorded is necessary.

The second technique predicts the motion of the subject, and the video captured by the camera that is shooting in the predicted direction is also recorded. In other words, the video of the subject that is being tracked is consisted of two videos, namely the video from the camera that is currently shooting the subject and the video from the camera that is shooting in the predicted direction. This means that video that does not include the image of the subject is also recorded. Therefore, in order to obtain only the video for tracking the subject, inconveniently, it is necessary to edit the videos, for example.

INDUSTRIAL APPLICABILITY

The present invention is applicable to a system for recording videos from a plurality of cameras that transmit data encoded with use of inter frame prediction, while switching among the cameras.

The invention claimed is:

1. A surveillance video accumulation system comprising a plurality of surveillance camera units and a video accumulation unit, the surveillance camera units and the video accumulation unit being capable of exchanging data with each other,
   wherein the surveillance video accumulation system further comprises:
       a selector operable to select one of the surveillance camera units that is currently shooting a subject;
       a selection information transmitter operable to transmit, to the surveillance camera units, selection information containing information indicating the one of the surveillance camera units selected by the selector;
       an accumulator operable to start receiving and accumulating video data from the one of the surveillance camera units when the selector selects the one of the surveillance camera units, the video data having been encoded according to a prediction encoding method; and
       a specifier operable to (i) specify, based on the video data from the selected one of the surveillance camera units, one or more of the surveillance camera units that (a) are different from the selected one of the surveillance camera units and (b) are expected to shoot the subject subsequently to the selected one of the surveillance camera units, and (ii) transmit, to the one or more of the surveillance camera units, specification information showing that each of the one or more of the surveillance camera units has been specified by the specifier, and
   wherein each of the surveillance camera units includes:
       a specification information receiver operable to receive the specification information;
       a selection information receiver operable to receive the selection information;
       an encoder operable to encode video data of the subject according to a prediction encoding method, the encoder (i) encoding the video data of the subject according to a prediction encoding method that uses either intra frame prediction or inter frame prediction until the specification information receiver has received the specification information, (ii) encoding the video data of the subject according to a prediction encoding method that uses only intra frame prediction when the specification information receiver receives the specification information, and (iii) encoding the video data of the subject according to a prediction encoding method that uses intra frame prediction and inter frame prediction when the selector performs the selection after the encoder has started encoding the video data of the subject when the specification information receiver receives the specification information; and
       a video data transmitter operable, when the surveillance camera unit is selected as the one of the surveillance camera units by the selector, to transmit the video data encoded by the encoder, in which at least a top frame has been encoded according to the prediction encoding method that uses only intra frame prediction, to the video accumulation unit.

2. The surveillance video accumulation system of claim 1, wherein the specifier specifies the one or more of the surveillance camera units by using a moving direction of the subject based on a motion vector included in the video data from the selected one of the surveillance camera units.

3. A surveillance camera unit included in a surveillance video accumulation system, the surveillance video accumulation system including a plurality of surveillance camera units and a video accumulation unit, the surveillance camera units and the video accumulation unit being capable of exchanging data with each other, the surveillance camera unit comprising:
    a specification information receiver operable to receive specification information, the specification information showing that the surveillance camera unit is specified as a surveillance camera that shoots a subject next;
    a selection information receiver operable to receive selection information containing information indicating one of the surveillance camera units;
    an encoder operable to encode video data of a subject of shooting according to a prediction encoding method, the encoder (i) encoding the video data of the subject according to a prediction encoding method that uses either intra frame prediction or inter frame prediction until the specification information receiver has received the specification information, (ii) encoding the video data of the subject according to a prediction encoding method that uses only intra frame prediction when the specification information receiver receives the specification information, and (iii) encoding the video data of the subject according to a prediction encoding method that uses intra frame prediction and inter frame prediction when the selection information receiver receives the selection information after the encoder has started encoding the video data of the subject when the specification information receiver receives the specification information; and
    a video data transmitter operable, when the selection information indicates that the surveillance camera unit is selected as the one of the surveillance camera units, to transmit the video data encoded by the encoder, in which at least a top frame has been encoded according to the prediction encoding method that uses only intra frame prediction, to the video accumulation unit.

4. The surveillance camera unit of claim 3, further comprising:
    a specifier operable, when the selection information receiver receives the selection information, (i) to specify, based on the video data being transmitted, one or more other surveillance camera units expected to shoot the subject subsequently to the surveillance camera unit, and (ii) to transmit, to the other surveillance camera units, specification information showing that each of the other surveillance camera units has been specified by the specifier.

5. A surveillance video accumulation method for use in a surveillance video accumulation system that includes a plurality of surveillance camera units and a video accumulation unit, the surveillance camera units and the video accumulation unit being capable of exchanging data with each other, the surveillance video accumulation method comprising:
    a selection step of selecting one of the surveillance camera units that is currently shooting a subject;

a selection information transmitting step of transmitting, to the surveillance camera units, selection information containing information indicating the one of the surveillance came units selected in the selection step;

a selection information receiving step, performed by each of the surveillance camera units, of receiving the selection information;

an accumulation step of receiving and accumulating video data from the one of the surveillance camera units when the selection step selects the one of the surveillance camera units, the video data having been encoded according to a prediction encoding method;

a specifying step of (i) specifying, based on the video data from the selected one of the surveillance camera units, one or more of the surveillance camera units that (a) are different from the selected one of the surveillance camera units and (b) are expected to shoot the subject subsequently to the selected one of the surveillance camera units, and (ii) transmitting, to the one or more of the surveillance camera units, specification information showing that each of the one or more of the surveillance camera units has been specified by the specifying step;

a specification information receiving step, performed by the one or more surveillance camera units, of receiving the specification information;

an encoding step, performed by each of the one or more surveillance camera units, of (i) encoding video data of the subject according to a prediction encoding method that uses either intra frame prediction or inter frame prediction until the specification information has been received, (ii) encoding the video data of the subject according to a prediction encoding method that uses only intra frame prediction when the specification information has been received, and (iii) encoding the video data of the subject according to a prediction encoding method that uses intra frame prediction and inter frame prediction when the selection information is received after encoding the video data of the subject when the specification information has been received; and a video data transmission step, performed by a surveillance camera unit when the surveillance camera unit is selected as the one of the surveillance camera units in the selection step, of transmitting the video data encoded in the encoding step, in which at least a top frame has been encoded according to the prediction encoding method that uses only intra frame prediction, to the video accumulation unit.

\* \* \* \* \*